United States Patent [19]

Carlyon

[11] Patent Number: 4,787,335
[45] Date of Patent: Nov. 29, 1988

[54] LITTER BOXES

[76] Inventor: John E. Carlyon, Rte. 1, Box 72-1, Fort Gibson, Okla. 74434

[21] Appl. No.: 74,149

[22] Filed: Jul. 16, 1987

[51] Int. Cl.⁴ .............................................. A01K 67/00
[52] U.S. Cl. ........................................................ 119/1
[58] Field of Search ....................................... 119/1, 19

[56] References Cited

U.S. PATENT DOCUMENTS

| | | | |
|---|---|---|---|
| 2,804,083 | 8/1957 | Wieber | 119/19 |
| 3,339,527 | 9/1967 | Burroughs | 119/1 |
| 3,596,636 | 8/1971 | Stobaugh | 119/1 |
| 3,890,930 | 6/1975 | Clark | 119/1 |
| 4,057,032 | 11/1977 | Dimitriadis | 119/1 |
| 4,171,680 | 10/1979 | Silver et al. | 119/1 |
| 4,299,190 | 11/1981 | Rhodes | 119/1 |
| 4,352,340 | 10/1982 | Strubelt | 119/1 |
| 4,576,116 | 3/1986 | Binkert | 119/19 |

FOREIGN PATENT DOCUMENTS

| | | | |
|---|---|---|---|
| 1185131 | 7/1982 | Canada | 119/1 |
| 941458 | 11/1963 | United Kingdom | 119/19 |

Primary Examiner—Gene Mancene
Assistant Examiner—R. Thomas Price
Attorney, Agent, or Firm—Laney, Dougherty, Hessin & Beavers

[57] ABSTRACT

A pet litter box consisting of a box having an A-frame structure for use in combination with a disposal bag. The box is constructed with relatively low peripheral side wall and an A-frame structure consisting of side struts suspending a center rod centrally over the box. A disposal bag of selected size and configuration is then secured over the box and A-frame while allowing access through one end, and the bag is periodically removable for waste disposal and subsequent replacement.

9 Claims, 2 Drawing Sheets

4,787,335

LITTER BOXES

BACKGROUND OF THE INVENTION

1. Field of the Invention

The invention relates generally to animal litter boxes and, more particularly, but not by way of limitation, it relates to cat litter boxes that are adapted to include specific disposal functions and materials.

2. Description of the Prior Art

The prior art includes numerous types of litter box and combinations including specific absorbent and deodorant materials as intended for usage in relatively confined areas. The prior art includes a number of teachings wherein a litter or toilet structure is combined with a disposal bag to enable periodic cleaning or refreshing of the litter material. These teachings, especially as used for cat litter, are well characterized by U.S. Pat. No. 3,890,930 entitled "Animal Commode". The commode structure carries an inner container having a removable lining affixed thereto by an elastic band such that the removable liner can be periodically removed and replaced to refresh the litter box.

Still other prior art teaches the use of tent-like frames for providing enclosure over an animal facility. These teachings are characterized by U.S. Pat. No. 4,576,116 entitled "Collapsible House for Cats" and U.S. Pat. No. 3,339,527 entitled "Animal Toilet". In these teachings the upper frame and cover structure is directed entirely to the enclosure function and there is no suggestion of disposability and replacement as required by the present invention.

SUMMARY OF THE INVENTION

The present invention relates to improvements in animal litter boxes and particularly to litter boxes suitable for use by cats. The litter box consists of a receptacle portion including a superstructure frame, and it is used in combination with a disposal bag that provides both privacy and disposability. The disposal bag may be a specific, customized design, or, in some cases, it may simply be a household waste bag of suitable size and weight.

Therefore, it is an object of the present invention to provide an effective cat litter box that is reliable of construction yet inexpensive.

It is also an object of the invention to provide a cat litter box that provides maximum privacy and greatly reduces likelihood of waste or scratchings escaping from the confines of the litter box.

It is still further an object of the present invention to provide a disposable waste litter box that may be readily packaged in suitable modular form for adaptation to the most convenient merchandising practices.

Finally, it is an object of the present invention to provide a cat litter box that is relatively simple and can be handled and manipulated with requirement of minimal skills and inconvenience.

Other objects and advantages of the invention will be evident from the following detailed description when read in conjunction with the accompanying drawings which illustrate the invention.

DETAILED DESCRIPTION OF THE INVENTION

Figure 1:
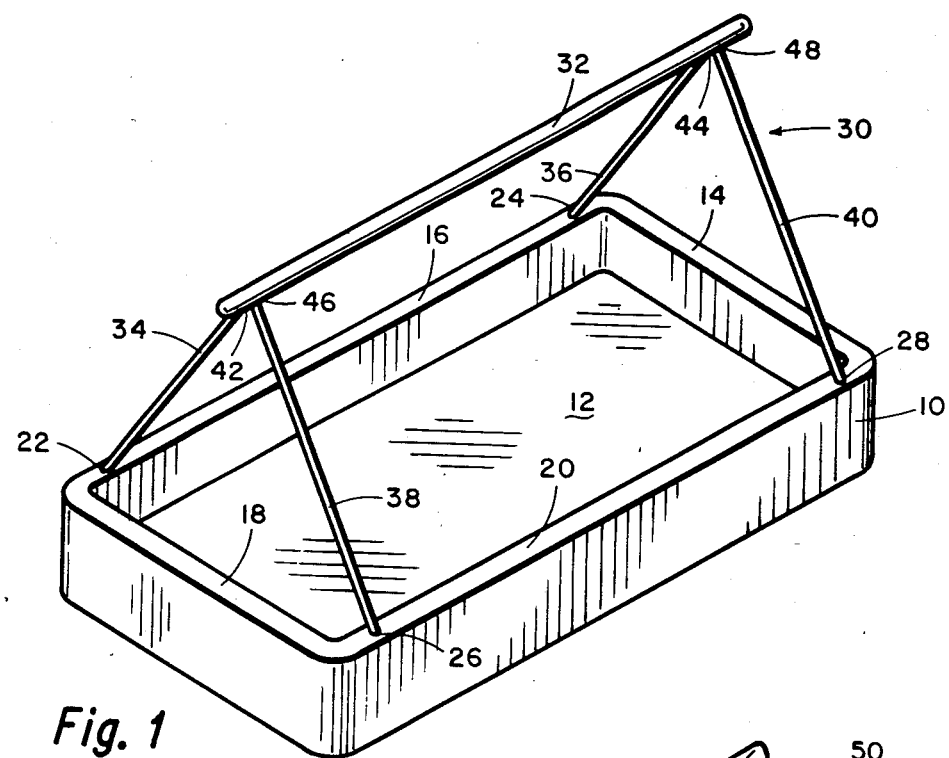
FIG. 1 is a perspective view of a cat litter box constructed in accordance with the present invention.
Figure 2:
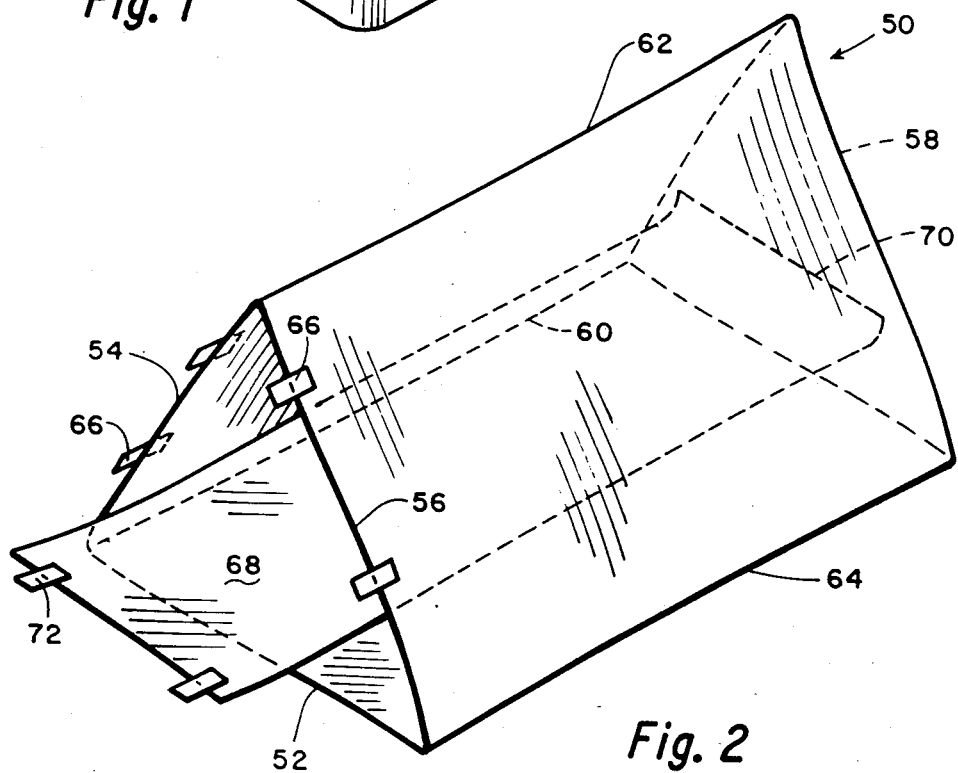
FIG. 2 is a similar perspective showing a disposal bag constructed in accordance with the present invention.
Figure 3:
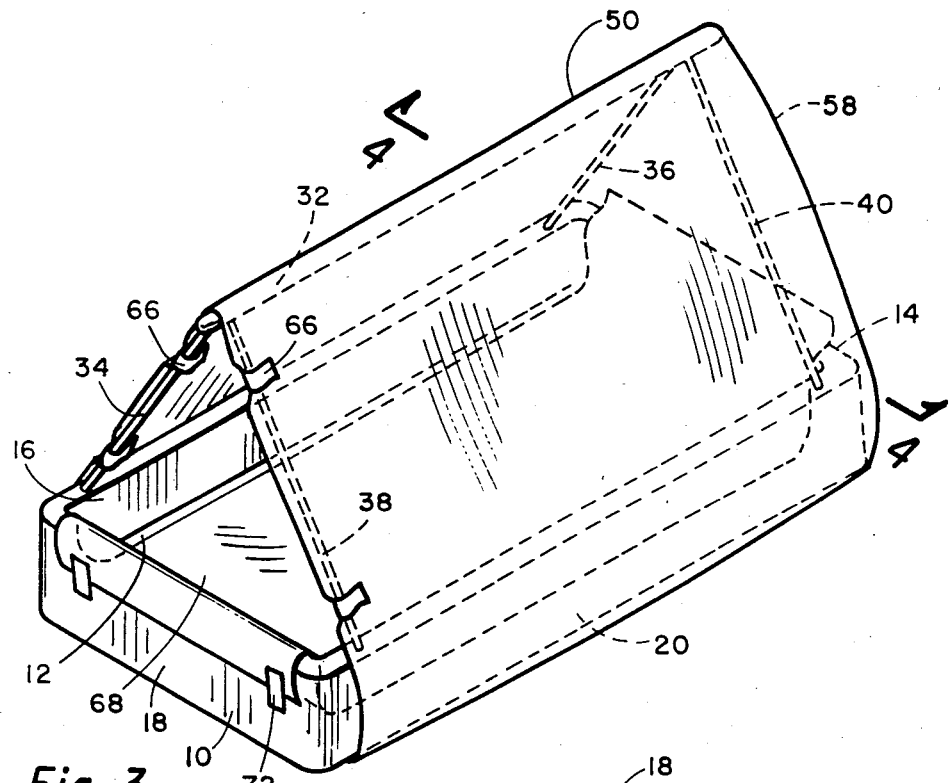
FIG. 3 is the like perspective view of the assembled litter box in combination with the disposal bag.

FIGS. 1 and 2 illustrate two components of the present invention, and FIG. 3 shows them as utilized in combination. In FIG. 1, a box 10 is formed to have a bottom 12 and relatively low side panels 14, 16, 18 and 20. The box 10 is preferably formed in an elongated shape such as a rectangle thereby to accomodate size and movements of a cat or other small house pet. The box 10 may be constructed from metal, wood or it may be molded in formation from a suitable plastic material, either solid or foamed plastic. A pair of spaced mounting holes 22, 24 and 26, 28 are formed angularly in the upper edge of respective long side panels 16 and 20.

An A-frame structure 30 consists of a center rod 32 and opposite side struts 34, 36 and 38, 40. The struts 34-40 may be formed from suitable dowel rods of equal length and the center rod 32 may be formed of a dowel rod of greater diameter which will allow formation of respective pairs of drill holes 42, 44 and 46, 48 for securely receiving the upper ends of struts 34-40.

The assembled box 10 and frame 30 as shown in FIG. 1, is then ready to receive a bag 50 (FIG. 2) in operative association therewith. The bag 50 in custom form is a three-sided bag formed with sides 52, 54 and 56 and enclosed by a triangular bottom panel 58. Thus, bag 50 defines a triad of edges 60, 62 and 64 which, in a custom formed bag 50, are specifically adapted for close fit relative to lower side edges of box 10 and the center rod 32. See FIG. 3. Suitable tape hinges 66 may be placed as desired around the front opening of side panels 52-56 to provide secure positioning of bag 50 by taping around the opposing struts 34 and 38.

A bottom sheet 68 of elongated, generally rectangular shape may be arrayed to cover the inside of opposite end panels 14 and 18 and the bottom 12 during operative coaction. A distal end 70 of protective sheet 68 may be secured as by heat welding, bonding or the like across the inside of bag bottom panel 58 and the outer or front edge may include tape hinges 72 suitable for securing the sheet 68 in place, as shown in FIG. 3.

Figure 4:
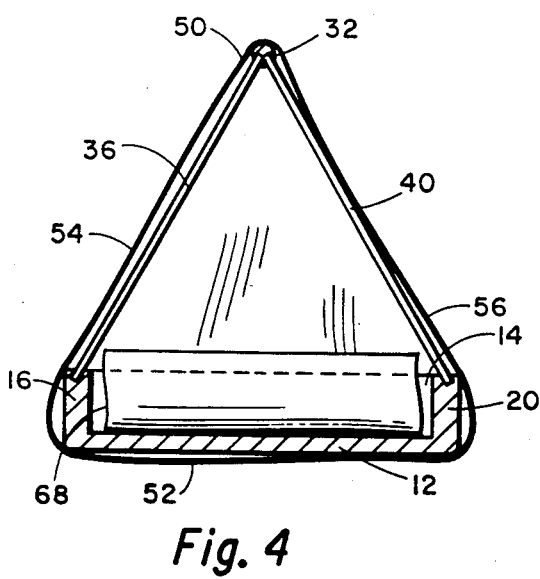
FIG. 4 is a vertical cross section taken along lines 4-4 of FIG. 3.

In operation, the unit is assembled as shown in FIGS. 3 and 4. That is, the bag 50 is drawn over the box 10 and frame 30 while the protective sheet 68 is pulled through the middle above the bottom 12 of box 10. The front hinge tapes 66 may then be secured around front struts 34, 38 to allow an entry opening across the front side panel 18. The protective sheet 68 is of length sufficient to fold tightly down over the rear side wall 14, along the bottom panel 12, and upward along the inner side of front panel 18 whereupon it folds over to be secured by hinge tapes 72. Litter additive or absorbent material, deodorizer and such may then be placed in the assembly on protective sheet 68 whereupon the pet may enter through the front side and do their litter function. The bag 50 may be transparent, translucent or even opaque since some pets, especially some cats, demand extreme privacy before carrying out the waste elimination function.

Figure 5:
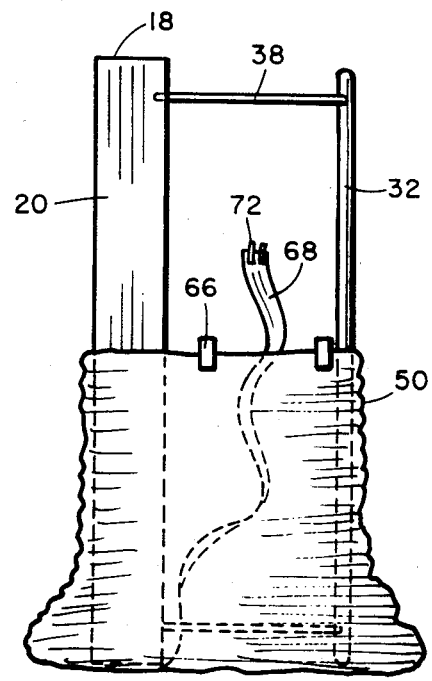
FIG. 5 is a view in side elevation of the litter box during the refreshing operation.

After a period of usage during which the litter box becomes soiled, the assembly can be upended in the manner shown in FIG. 5 for removal of all waste in the disposal bag 50. Thus, with the assembly on end, the hinge tapes 66 and 72 can be unfastened and the upper extremities of bag 50 will simply fall away to allow withdrawal of box 10 and A-frame structure 30. Also, the protective sheet 68 falls down through the center of A-frame 30 along with the soiled matter, and the tucked portions within the front and rear corners of bottom 12 are prevented from retaining any excess soiled litter material. The bag 50 may then simply be suitably closed, either by knotting, tying or sealing with the hinge tabs 66, and suitably disposed of.

While a custom formed bag 50 such as that of FIG. 2 may be utilized to provide best fit and functional coaction, it should be understood that any available bag or sack of sufficient size to receive the box 10/frame 30 assembly may be utilized. In some cases, it may be desirable to construct the litter box and A-frame of sufficient size for specific use with a known size and type of commercially available garbage or other trash bag.

It is contemplated that the box 10 and A-frame 30 as well as a multiple of replacement bags may be readily merchandised in a convenient packaging within the box 10. All struts and rod 32 and a selected plurality of disposal bags 50 may be suitably packed within the box 10 for subsequent merchandise packaging in a neat, rectangular shape. To set up for use, the rod 32 and struts 34-40, formed of suitable plastic or wood structure, are simply snapped into place and inserted in their respective receptacle holes and a first disposal bag 50 is inserted over the box/A-frame assembly as shown in FIG. 3.

The foregoing discloses a novel pet litter box that is especially useful for care of cats as it includes a disposal bag that also insures a degree of privacy during waste elimination. The device is simply constructed yet sturdy and reliable in usage and it is particularly adaptable to an attractive merchandising package.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. A pet litter apparatus comprising:
    a frame which includes:
        a container having a substantially rectangular bottom panel and a peripheral array of substantially upright side panels,
        a rod member positioned generally centrally of and parallel to said container bottom at a spaced position therefrom, said rod member extending from above one end of said bottom panel to above the other end thereof, and
        a plurality of elongate struts extending from said side panels to said rod member for substantially rigidly supporting said rod member;
    a disposable bag having a planar end and a plurality of sides, said bag being of a size sufficient to receive said frame therein with said bag end being abutted against one end of said container; and
    a sheet having one end fixedly secured to the interior side of said bag end for substantially covering said bottom panel when said frame is so received in said bag said bag receiving waste material from said container when one end of said frame is tipped over on its side and said frame is removed therefrom.

2. The apparatus of claim 1 wherein said bag end is substantially triangular in shape.

3. The apparatus of claim 2 wherein said bag further includes three sides extending from each side of said bag end and a substantially triangular opening opposite said bag end.

4. The apparatus of claim 3 wherein said sheet is substantially rectangular in shape and is secured to said bag end substantially parallel to one side thereof.

5. The apparatus of claim 4 wherein said sheet is spaced from said one side of said bag end a sufficient distance to permit one end of said container to be abutted against said bag end beneath said sheet when said frame is so received in said bag.

6. The apparatus of claim 5 wherein said sheet is long enough to cover said bottom panel and to extend over the side panel facing said bag opening when said frame is so received in said bag.

7. The apparatus of claim 6 wherein said struts are mounted on said side panels adjacent opposing ends thereof.

8. The apparatus of claim 7 wherein said bag further includes tape strips secured thereto adjacent said bag opening for taping the same to the struts adjacent said bag opening when said frame is so received in said bag.

9. The apparatus of claim 8 wherein said sheet further includes tape strips secured thereto on the sheet end adjacent said bag opening for releasably securing said sheet to said container when said frame is so received in said bag.

* * * * *